(12) United States Patent
Lee et al.

(10) Patent No.: US 7,542,442 B2
(45) Date of Patent: Jun. 2, 2009

(54) UPLINK SCHEDULING METHOD IN VOIP

(75) Inventors: Ho-Won Lee, Chungju-si (KR); Dong-Ho Cho, Seoul (KR); Sang-Boh Yun, Saongnam-si (KR); Sung-Hyun Cho, Seoul (KR); Won-Hyoung Park, Seoul (KR); Ki-Ho Lee, Daejeon (KR); Tae-Soo Kwon, Daejeon (KR); Ju-Yeop Kim, Anyang-si (KR); Sik Choi, Daejeon (KR)

(73) Assignees: Samsung Electronics Co., Ltd (KR); Korea Advanced Institute of Science & Technology (KR)

( * ) Notice: Subject to any disclaimer, the term of this patent is extended or adjusted under 35 U.S.C. 154(b) by 549 days.

(21) Appl. No.: 11/205,594

(22) Filed: Aug. 17, 2005

(65) Prior Publication Data

US 2006/0039319 A1 Feb. 23, 2006

(30) Foreign Application Priority Data

Aug. 17, 2004 (KR) .................. 10-2004-0064854

(51) Int. Cl.
*H04Q 7/24* (2006.01)
(52) U.S. Cl. .................. 370/328; 370/329; 455/450

(58) Field of Classification Search .................. None
See application file for complete search history.

(56) References Cited

U.S. PATENT DOCUMENTS

| 6,771,987 | B1 | 8/2004 | Dam et al. |
| 2001/0043577 | A1* | 11/2001 | Barany et al. ............... 370/328 |
| 2004/0102202 | A1 | 5/2004 | Kumaran et al. |
| 2004/0224677 | A1 | 11/2004 | Kuchibhotla et al. |
| 2005/0089064 | A1* | 4/2005 | Zimmerman et al. ........ 370/468 |
| 2005/0111389 | A1 | 5/2005 | Dick et al. |
| 2005/0138451 | A1 | 6/2005 | Simpson et al. |

FOREIGN PATENT DOCUMENTS

WO WO 03/107694 12/2003

* cited by examiner

*Primary Examiner*—Erika A Gary
(74) *Attorney, Agent, or Firm*—The Farrell Law Firm, PC (57) ABSTRACT

A method of scheduling uplink resources in a wireless communication system supporting VoIP service is provided. A BS allocates an identical amount of the resource continuously until an uplink data rate is changed by an SS's request for a data rate change. When the data rate is changed, the SS reports this event to the BS so that the BS allocates an amount of resource corresponding to the requested data rate.

12 Claims, 6 Drawing Sheets

UPLINK SCHEDULING METHOD IN VOIP

PRIORITY

This application claims priority under 35 U.S.C. § 119 to an application entitled "Uplink Scheduling Method In VoIP" filed in the Korean Intellectual Property Office on Aug. 17, 2004 and assigned Serial No. 2004-64854, the contents of which are incorporated herein by reference.

BACKGROUND OF THE INVENTION

1. Field of the Invention

The present invention relates generally to an uplink scheduling method in a wireless system, and in particular, to a method of scheduling uplink resources for VoIP (Voice over Internet Protocol).

2. Description of the Related Art

A pressing need exists for a scheduling scheme to efficiently use resources in a wireless system that provides a variety of services with limited resources. It is ideal that unnecessarily allocated resources are quickly returned and re-allocated by scheduling. In addition, a technique for utilizing residual resource saved by reducing the data amount, for other purposes, can be considered.

There are many conventional uplink scheduling types for VoIP service.

Major examples are UGS (Unsolicited Grant Service) and rtPS (realtime Polling Service).

The UGS allocates uplink resources of a fixed size upon user request. The user then sends transmission data to a base station (BS) using the uplink resources. The rtPS allocates required resources in response to a periodic uplink resource allocation request from the user. Thus, the user sends transmission data using resources allocated corresponding to the amount of the transmission data.

Figure 1:
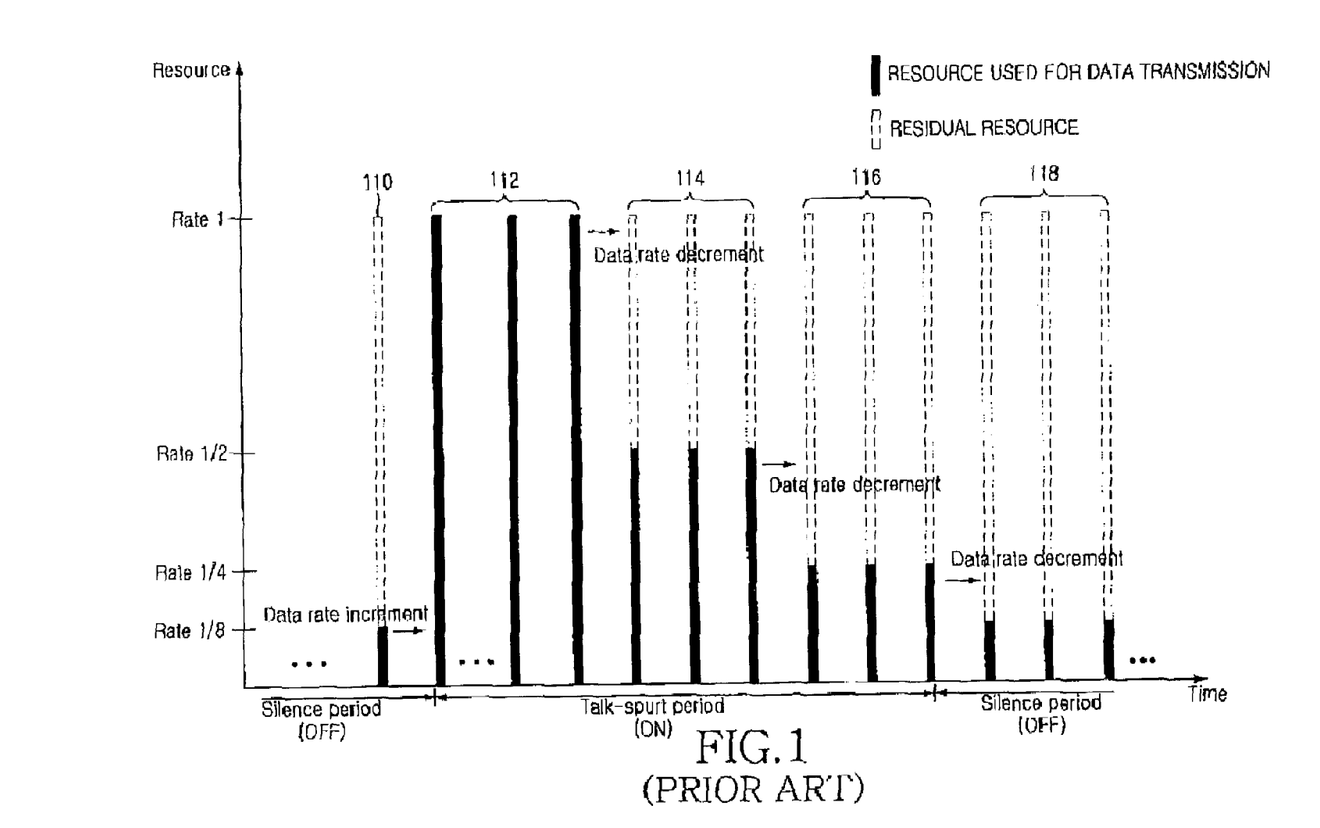
FIG. 1 is a graph illustrating a conventional UGS-based uplink scheduling procedure.

FIG. 1 is a graph illustrating a conventional UGS-based uplink scheduling procedure.

Referring to FIG. 1, mobile status is divided largely into a talk-spurt period (ON) and a silence period (OFF) on a time axis. Transmission data packets exist in the talk-spurt period, whereas no transmission data packets exist in the silence period. In the illustrated case of FIG. 1, resources supporting a maximum rate (Rate 1) are fixedly allocated.

However, a subscriber station (SS) does not send data using all the allocated resources. Only minimum required resources (e.g. Rate ⅛) are used to maintain the service in silence periods 110 and 118.

Even in a talk-spurt period, only part of the allocated resources may be used. That is, the SS sends data packets using the allocated resources fully or partially in the talk-spurt period. For example, data packets are sent at Rate 1 using all the allocated resources in a talk-spurt period 112. On the other hand, data packets are sent at Rate ½ in a talk-spurt period 114 due to a decrease in the amount of transmission data. In a talk-spurt period 116, data packets are sent using no more than a quarter of the allocated resources. Then the SS uses the minimum resources in the silence period 118. The minimum resources are those supporting the minimum rate, Rate ⅛.

As described above, part of the fixedly allocated resources become residual resource in the periods 114, 116 and 118 using rates other than the maximum rate. This implies inefficient uplink scheduling. As a result, uplink resources are dissipated in the talk-spurt periods as well as in the silence periods.

Figure 2:
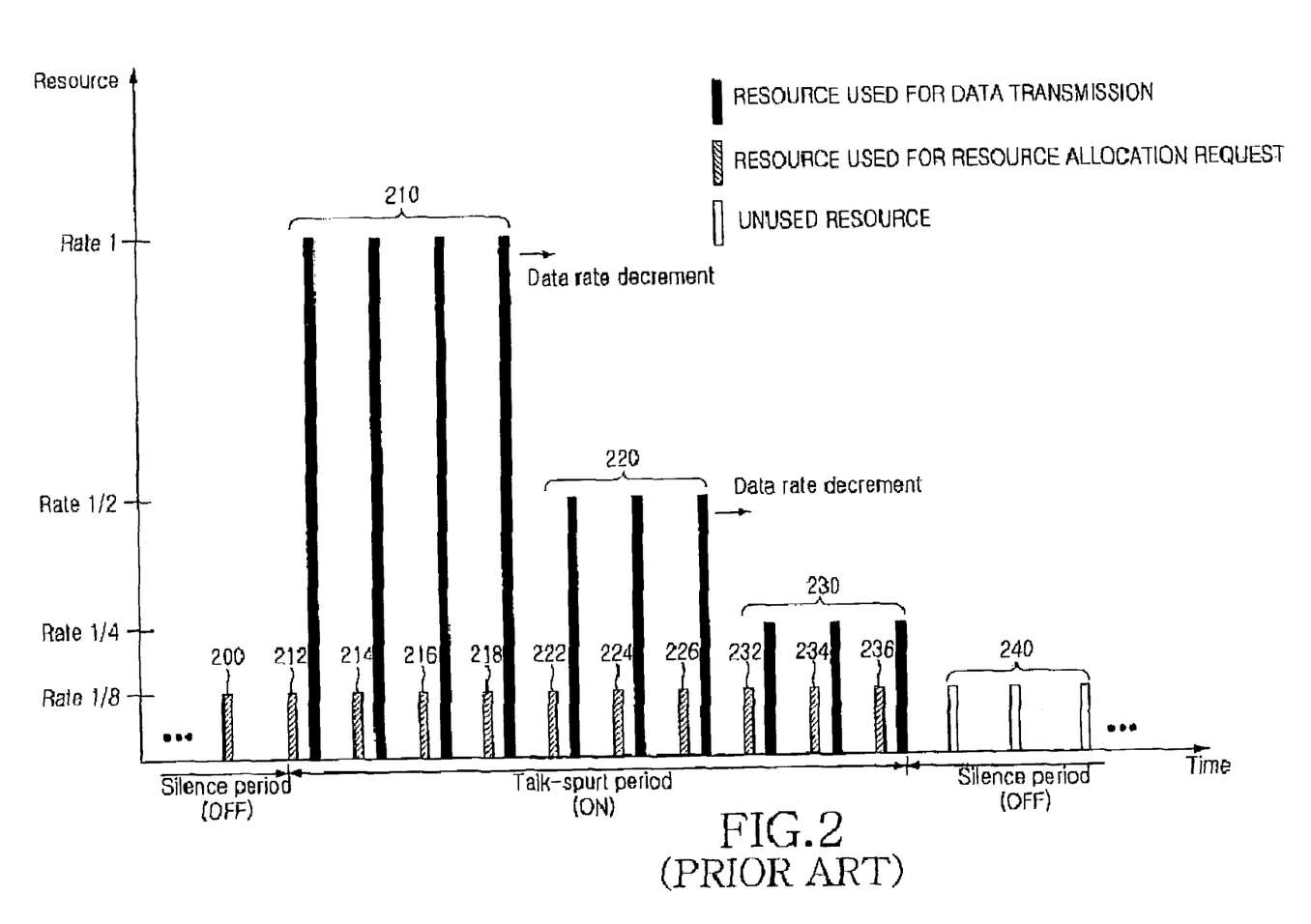
FIG. 2 is a graph illustrating a conventional rtPS-based uplink scheduling procedure.

FIG. 2 is a graph illustrating a conventional rtPS-based uplink scheduling procedure.

Referring to FIG. 2, the SS sends a resource allocation request to the BS in the rtPS, as indicated by reference numerals 212 to 236. The BS allocates requested uplink resources to the SS. The SS then sends data packets using the allocated resources, as indicated by reference numerals 210, 220 and 230.

There are three talk-spurt periods 210, 220 and 230 according to the data rates used. Data packets are sent at Rate 1 in the first talk-spurt period 210, at Rate ½ in the second talk-spurt period 220, and at Rate ¼ in the third talk-spurt period 230. Accordingly, the SS requests different amounts of resources in the talk-spurt periods 210, 220 and 230. Transitions from the talk-spurt period 210 to the talk-spurt period 220 and from the talk-spurt period 220 to the talk-spurt period 230 occur due to the decrease of data rate in the MS.

To be more specific, upon generation of data packets in a silence period, the SS requests resource allocation in step 212. The BS allocates maximum resources to support a maximum data rate (e.g. Rate 1). The SS sends data packets at Rate 1 using the allocated resources. The data transmission at Rate 1 is repeated in the talk-spurt period 210.

As the data rate changes due to the decrease in the amount of transmission data in the talk-spurt period 210, the SS requests resource allocation supporting a decreased data rate, Rate ½ in step 222. Then, the SS sends data packets using resources allocated by the BS. The data transmission at Rate ½ is repeated in the talk-spurt period 220.

If the data rate is to be further reduced in the talk-spurt period 220, the SS requests resource allocation supporting a decreased data rate, Rate ¼ in step 232. Then, the SS sends data packets at Rate ¼. The data transmission at Rate ¼ is repeated in the talk-spurt period 230.

After the data transmission is completed, the SS operates using minimum resources (e.g. Rate ⅛) in a silence period 240.

As noted from the above description, a periodic polling from the SS (i.e. uplink resource requests 212 to 218, 222 to 226, and 232 to 236) is required in the rtPS. Thus, even in the case where data packets are to be sent using the same resources as indicated by reference numerals 210, 220 and 230, the periodic polling 214 to 218, 224 to 226, and 234 to 236 is performed. The unnecessary polling leads to dissipation of uplink resources.

As described above, the UGS and rtPS allocate uplink resources periodically according to their scheduling types irrespective of real-time mobile status. That is, the time-variant mobile status is not reflected in real time in the uplink scheduling. Accordingly, a need exists for developing an efficient uplink scheduling scheme for reflecting mobile status in real time.

SUMMARY OF THE INVENTION

An object of the present invention is to substantially solve at least the above problems and/or disadvantages and to provide at least the advantages below. Accordingly, an object of the present invention is to provide an efficient uplink scheduling method for VoIP service.

Another object of the present invention is to provide an uplink scheduling method for minimizing unnecessary resource consumption in allocating uplink resources.

A further object of the present invention is to provide an uplink scheduling method for preventing an SS from unnecessarily requesting resource allocation to a BS.

Still another object of the present invention is to provide an uplink scheduling method for allocating optimum resource to support a data rate requested by an SS.

Yet another object of the present invention is to provide a method of performing uplink scheduling according to a rate-change notification from an SS.

The above objects are achieved by providing a method of scheduling uplink resources in a wireless communication system supporting VoIP service.

According to one aspect of the present invention, in a method of scheduling uplink resources in an SS in a wireless communication system supporting VoIP, the SS requests allocation of resources by which to send VoIP data to a BS and is allocated the resources supporting a maximum data rate periodically from the BS. The SS sends the VoIP data at the maximum data rate.

When requesting the resource allocation, the SS also sends to the BS bandwidth request information requesting continuous allocation of the same resources until the maximum data rate is changed. In response to the resource allocation request, the first resources are allocated before the first resource allocation period comes after reception of the resource allocation request, irrespective of the period.

According to another aspect of the present invention, in a method of scheduling uplink resources in a BS in a wireless communication system supporting VoIP, the BS receives a resource allocation request for transmission of VoIP data from an SS. In response to the resource allocation request, the BS periodically allocates resources required for data transmission at a maximum data rate from the SS. Along with the resource allocation request, the BS also receives from the SS bandwidth request information requesting continuous allocation of the same resources until the maximum data rate is changed. The first resources in response to the resource allocation request are allocated before the first resource allocation period comes after reception of the resource allocation request, irrespective of the period.

According to a further aspect of the present invention, in a method of scheduling uplink resources in an SS in a wireless communication system supporting VoIP, the SS requests allocation of resources by which to send VoIP data to a BS. The SS sends the VoIP data at a maximum data rate using resources allocated by the BS. When the data rate is changed, the SS sends to the BS data at the changed data rate, and sends to the BS notification information indicating the rate change using remaining resources. When requesting resource allocation, the SS also sends bandwidth request information requesting continuous allocation of the same resources until the data rate is changed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In accordance with the present invention as described below, resources are allocated upon receipt of a resource allocation request from an SS. The SS sends data packets using the allocated resources without polling until it changes the resources. Meanwhile, the SS requests continuous allocation of the same resources from a BS without polling. For this purpose, a predetermined pattern is set in the Bandwidth Request field of a Bandwidth Request Header, prior to transmission. In the predetermined pattern, all bits of the Bandwidth Request field are set to 1 s.

If a data rate-down is required, the SS sends data packets at a decreased data rate and notifies the BS that the resources used are changed due to the rate-down. Thus, the BS can use residual resource saved from the SS for another purpose.

The SS can notify the BS of a rate change in two ways in the present invention.

One of them is to add an STI (StaTus Indicator) field to an existing Grant Management subheader format. To apply this method, a bit value indicating a rate change must be defined for the STI field. For example, the bit is set to 1 if the data rate is changed and to 0 if the data rate is kept the same. The STI field is formed by borrowing one bit from a 16-bit PBR (Piggy Back Request) field in the conventional Grant Management subheader. The addition of the STI field results in a 15-bit PBR field. Thus, the following Grant Management subheader format can be proposed as shown in Table 1 below.

TABLE 1

| Syntax | Size | Notes |
|---|---|---|
| Grant Management subheader ( ) { | | |
| if (scheduling service type=UGS) { | | |
| SI | 1 bit | |
| PM | 1 bit | |
| Reserved | 14 bit | Shall be set to zero |
| } | | |
| Else if (Extended rtPS support && scheduling service type=rtPS) { | | |
| StaTus Indicator | 1 bit | |
| PiggyBack Request | 15 bit | |
| } | | |
| Else{ | | |
| PiggyBack Request | 16 bit | |
| } | | |
| } | | |

Table 2 below defines fields used for the embodiment of the present invention among the fields listed in Table 1.

TABLE 2

| PBR | 15 or PiggyBack Request |
|---|---|
| | 16  The number of bytes of uplink bandwidth requested by the |

TABLE 2-continued

| | | |
|---|---|---|
| | | SS. The bandwidth request is for the CID. The request shall not include any PHY overhead. The request shall incremental.<br>15 = Used by the Extended rtPS enabled SS<br>16 = default |
| PM | 1 | Poll-Me<br>0 = No action<br>1 = Used by the SS to request a bandwidth poll. |
| SI | 1 | Slip Indicator<br>0 = No action<br>1 = Used by the SS to indicate a slip of uplink grants relative to the uplink queue depth |
| STI | 1 | StaTus Indicator<br>0 = No action<br>1 = Used by the SS to indicate a status of data rate decrement. |

In Table 2, the number of the bits in the PBR field is determined according to whether the 1-bit STI field is used or not. When the STI bit is used, the PBR field has 15 bits. In the absence of the STI bit, the PBR field has 16 bits. The STI bit indicates that the data rate is changed. If the STI bit is 0, no action is indicated in relation to a rate change. If the STI bit is 1, a rate change is indicated.

The other way for the SS to notify the BS of a rate change is to use the PBR field of the existing Grant Management subheader format. For this method, a specific bit pattern must be defined for the PBR field, which indicates a rate change. This bit pattern is different from existing bit patterns used for other purposes. For example, the 16-bit PBR field is set to all 0s to indicate a rate change. Table 3 below defines each field in the Grant Management subheader format to implement this PBR-based rate-change notification method.

TABLE 3

| Name | Length (bits) | Description |
|---|---|---|
| PBR | 16 | PiggyBack Request<br>The number of bytes of uplink bandwidth requested by the SS. The bandwidth request is for the CID. The request shall not include any PHY overhead.<br>The request shall incremental.<br>0000000000000000 = In case of the Extended rtPS used by SS to indicate a status of data rate decrement |
| PM | 1 | Poll-Me<br>0 = No action<br>1 = Used by the SS to request a bandwidth poll. |
| SI | 1 | Slip Indicator<br>0 = No action<br>1 = Used by the SS to indicate a slip of uplink grants relative to the uplink queue depth |

A. Scheduling Procedure

An uplink scheduling procedure proposed by the present invention will be described in detail below.

Figure 3:
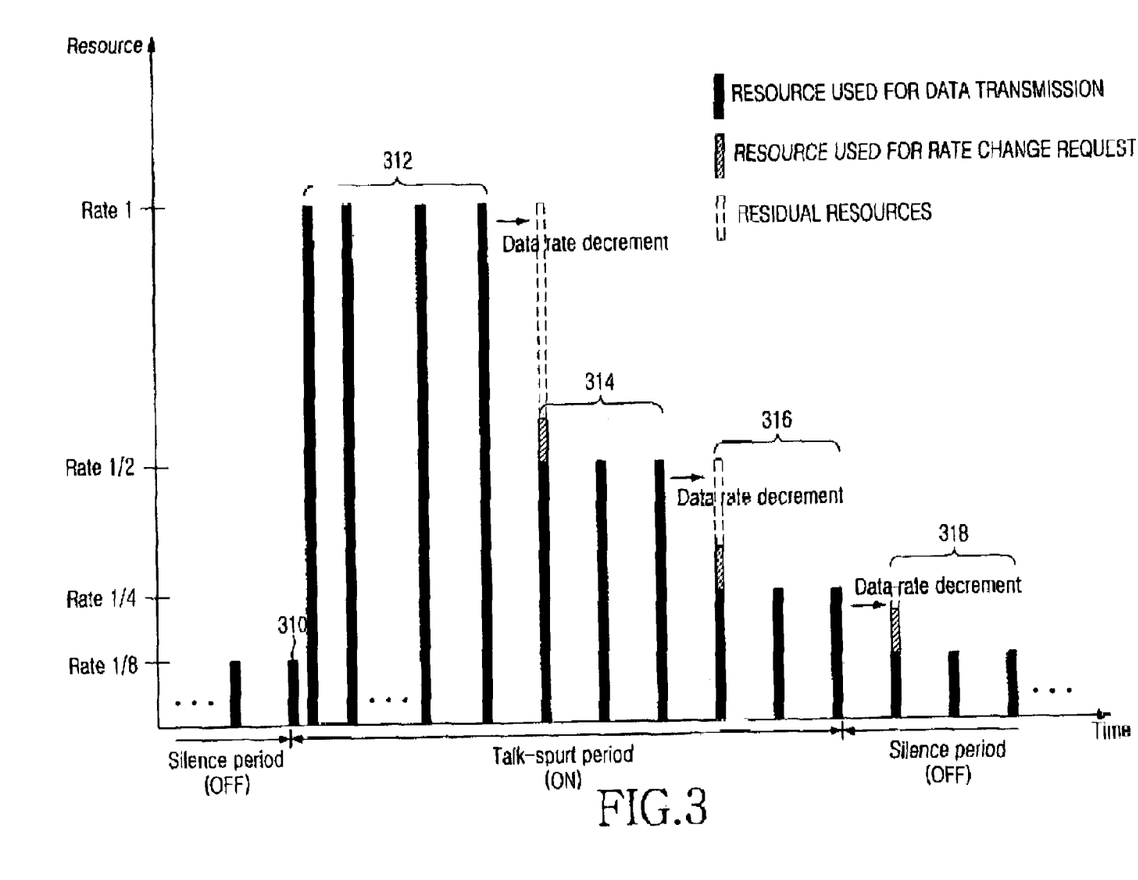
FIG. 3 is a graph illustrating an uplink scheduling procedure according to an embodiment of the present invention.

FIG. 3 is a graph illustrating an uplink scheduling procedure according to an embodiment of the present invention. Referring to FIG. 3, mobile status is divided largely into a talk-spurt period (ON) and a silence period (OFF) on a time axis. Transmission data packets exist in the talk-spurt period, whereas no transmission data packets exist in the silence period.

An SS requests resource allocation from a BS when it transitions from the silence period to the talk-spurt period, as indicated by reference numeral 310. The resource allocation request is sent using pre-allocated minimum resources. For instance, the SS uses a Bandwidth Request Header to request resource allocation. The Bandwidth Request Header carries bandwidth request information requesting continuous allocation of the same resources even though the SS does not perform polling.

Table 4 below lists fields in the Bandwidth Request Header and the lengths and characteristics of the fields.

TABLE 4

| Name | Length (bits) | Description |
|---|---|---|
| BR | 19 | Bandwidth Request<br>The number of bytes of uplink bandwidth requested by the SS. The bandwidth request is for the COD. The request shall not include any PHY overhead.<br>1111111111111111111 = In case of the Extended rtPS used by SS to indicate a status of data rate increment |
| CID | 16 | Connection Identifier |
| EX | 1 | Always set to zero |
| HCS | 8 | Header Check Sequence<br>Same usage as HCS entry in Table 5 |
| HT | 1 | Header Type = 1 |
| Type | 3 | Indicates the type of bandwidth request header |

The bandwidth request information is delivered in the Bandwidth Request (BR) field. In Table 4, the bandwidth request information is defined as a bit stream of 19 bits being set to all 1 s.

Upon receipt of the Bandwidth Request Header, the BS periodically allocates resources required for data transmission at a maximum data rate to the SS. The SS sends data using the allocated resources, as indicated by reference numeral 312. The data transmission is carried out at the maximum data rate, Rate 1.

However, the data transmission using the initially allocated resources for the resource allocation request is not periodical. That is, the data transmission using the initially allocated resources occurs between the resource allocation requested time and the first one of periodic data transmissions.

If a rate change is required while periodically sending data at the maximum rate, the SS sends data at a changed rate in the next transmission interval. The changed rate is lower than the previous rate. In the illustrated case of FIG. 3, the SS changes its rate from Rate 1 to Rate ½. Meanwhile, the SS sends to the BS notification information indicating the rate change using residual resource saved from the rate-down. The specific methods of sending the notification message using the Grant Management subheader to the BS have been described before. The SS then periodically sends data at the changed rate, as indicated by reference numeral 314.

Upon receipt of the notification information in the Grant Management subheader, the BS allocates minimum required resources to support Rate ½ to the SS. The resource allocation accompanying the rate change is performed when needed. That is, if current available resources are sufficient, the BS does not need return allocated resources from the SS in real time.

If a rate change is required while periodically sending data at Rate ½, the SS sends data at a changed rate, Rate ¼, in the next transmission interval and notifies the BS of the rate change. The SS then periodically sends data at Rate ¼, as indicated by reference numeral 316. Upon receipt of the notification information in the Grant Management subheader, the BS allocates minimum required resources to support Rate ¼ to the MS.

If a rate change is required or transmission data does not exist while periodically sending data at Rate ¼, the SS changes the rate to Rate ⅛ for the next transmission interval. Rate ⅛ is assumed to be the lowest rate available to the SS and notifies the BS of the rate change. Then the SS operates normally in a silence period 318.

B. Signaling

Figure 4:
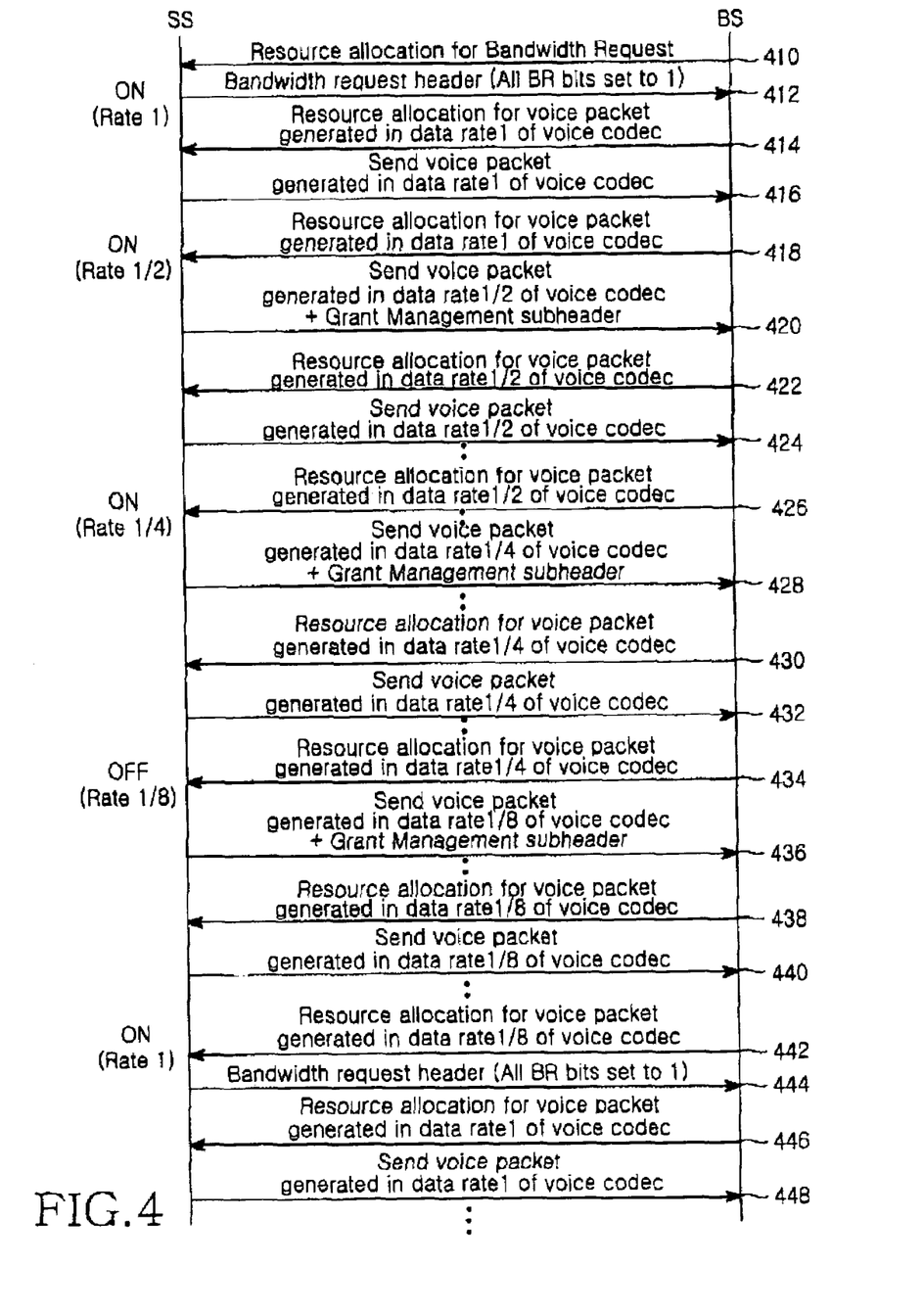
FIG. 4 is a diagram illustrating signaling between an SS and a BS for the uplink scheduling according to the embodiment of the present invention.

Signaling between the SS and the BS in the uplink scheduling of the present invention will be described in detail with reference to the diagram of FIG. 4. Referring to FIG. 4, the BS allocates minimum required resources for transmission of a resource allocation request from the SS in step 410. Typically, resources supporting transmission of 16-byte information suffice for transmission of the resource allocation request from the SS. Because it is assumed herein that the resource allocation request is sent at Rate ⅛, the minimum required resources for the resource allocation request support Rate ⅛.

In the presence of transmission data, the SS sends to the BS a Bandwidth Request Header requesting resource allocation using the allocated minimum resources in step 412. A talk-spurt period starts with sending the Bandwidth Request Header. Application of the uplink scheduling according to the present invention needs to be notified by the Bandwidth Request Header. That is, the Bandwidth Request Header carries information indicating that an additional resource allocation request will not be sent until the data rate is changed. For example, the BR field of the Bandwidth Request Header is set to all 1 s.

Upon receipt of the Bandwidth Request Header, the BS allocates resources by which the SS can send data packets at the maximum data rate, Rate 1 in step 414. The SS sends data packets at Rate 1 using the allocated resources in step 416. The resource allocation step 414 and the data transmission step 416 are repeated until the data rate is changed.

In step 418, the SS is allocated resources supporting the current rate, Rate 1 by the BS. If the data rate is changed to Rate ½, the SS sends data packets at Rate ½ in step 420. The SS also sends a Grant Management subheader indicating the rate change from Rate 1 to Rate ½ to the BS. The changed rate is not always indicated by the Grant Management subheader. In other words, the SS notifies the BS of only the rate change by the Grant Management subheader and the BS finds out from the Grant Management subheader that the uplink rate has been changed to a one level-lower rate. The rate change can be indicated by the Grant Management subheader in various ways. The present invention has proposed two main techniques: adding the STI field to the Grant Management subheader, and using the PBR field of the Grant Management subheader. These techniques have been described earlier and their description will not be repeated at this time.

The BS determines from the Grant Management subheader that the uplink rate has been changed. In step 422, the BS allocates resources supporting the changed rate, Rate ½. The resulting residual resource supporting up to Rate ½ can be used for other purposes. On the other hand, the resource allocation in step 422 may not be performed immediately after reception of the Grant Management subheader. If the BS has sufficient available resources, it allows the SS to maintain the previous allocated resources. When the residual resource are needed, the BS then re-allocates resources to the SS. Therefore, between steps 420 and 422, the SS continues sending data packets to the BS using the existing allocated resources. Notably, some resources are saved as residual resource in the SS's data transmission in steps 420 and 422. However, after the BS allocates resources supporting Rate ½, there are no residual resource produced from data transmission in step 424.

If the uplink rate is changed to Rate ¼ with the resources supporting Rate ½ in step 426, the SS sends data packets at the changed rate, Rate ¼ in step 428. The SS also sends the Grant Management subheader to the BS, indicating the rate change from Rate ½ to Rate ¼.

The BS determines from the Grant Management subheader that the uplink rate has been changed. In step 430, the BS allocates required resources supporting Rate ¼. The resulting residual resource supporting up to Rate ¼ can be used for other purposes. However, the resource allocation in step 430 may not be performed immediately after the Grant Management subheader is received. If the BS has sufficient available resources, it allows the SS to maintain the previous allocated resources. When the residual resource are needed, the BS then re-allocates resources to the SS. Therefore, the SS continues sending data packets to the BS using the existing resources until just before step 430. In this case, residual resources are produced. However, as the SS sends data packets using resources re-allocated by the BS in step 432, there are no residual resources produced from the data transmission.

The BS allocates resources supporting Rate ¼ in step 434. At the time, the uplink rate is changed to Rate ⅛. Rate ⅛ is the minimum rate that the SS can support. In the present invention, Rate ⅛ is used in a silence period. Therefore, the silence period starts with the rate change to Rate ⅛. The SS can send data using allocated resources or request resource allocation in the silence period. In the illustrated case of FIG. 4, the SS sends data at Rate ⅛ until just before the SS requests resource allocation in step 444.

In step 436, the SS sends data packets at Rate ⅛ and a Grant Management subheader indicating the rate change from Rate ¼ to Rate ⅛. In the absence of data packets in step 436, no data transmission is carried out.

The BS determines from the Grant Management subheader that the uplink rate has been changed. In step 438, the BS allocates required resources supporting Rate ⅛. The SS sends data packets at Rate ⅛ in steps 440 and 442.

The BS allocates required resources supporting Rate ⅛ in step 434. It is assumed at this moment that transmission data to be sent at an increased rate has been generated in the SS. Therefore, this time becomes the start of a talk-spurt period.

In step 444, the SS sends a Bandwidth Request Header to the BS using the allocated minimum resources required to support Rate ⅛. The Bandwidth Request Header carries information indicating that an additional resource allocation request will not be sent until the data rate is changed.

Upon receipt of the Bandwidth Request Header, the BS allocates resources by which the SS can send data packets at the maximum data rate, Rate 1 in step 446. The SS then sends data packets at Rate 1 using the allocated resources in step 448.

C. Operation in the SS

Figure 5:
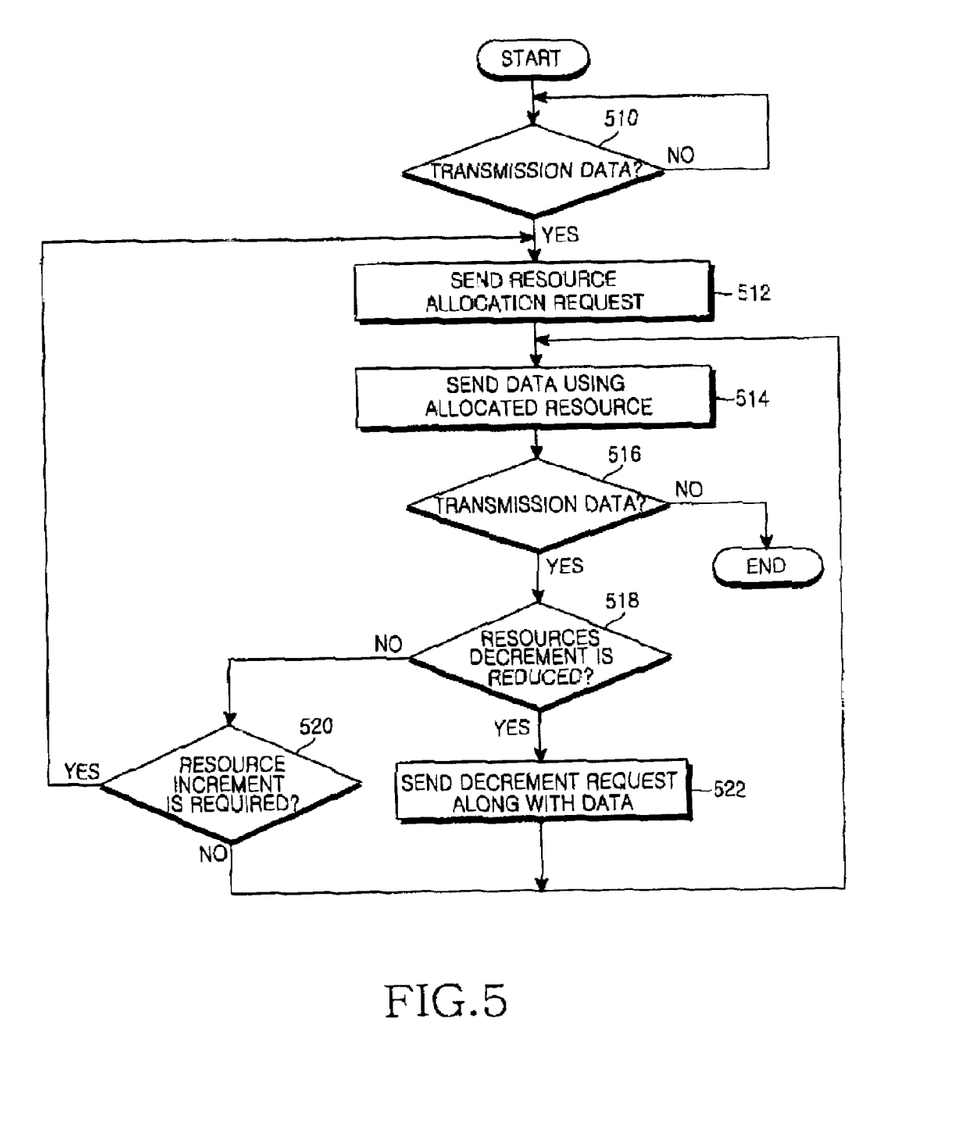
FIG. 5 is a flowchart illustrating an operation of the SS for the uplink scheduling according to the embodiment of the present invention.

FIG. 5 is a flowchart illustrating an operation of the SS for the uplink scheduling according to the embodiment of the present invention. Referring to FIG. 5, the SS determines the presence or absence of data to be transmitted by VoIP in step 510. In the presence of transmission data, the SS requests resource allocation to the BS by a Bandwidth Request Header in step 512. The Bandwidth Request Header carries information indicating that an additional resource allocation request will not be sent until the data rate is changed. For this purpose, the SS can set the 19-bit BR field of the Bandwidth Request Header to all 1 s, for example. Meanwhile, the SS can be allocated resources required for transmission of the Bandwidth Request Header beforehand from the BS.

After the BS allocates resources, the SS sends data using the allocated resources in step 514. The allocated resources usually support the maximum data rate available for the SS (e.g. Rate 1).

The SS continuously monitors the presence of data packets to be sent in step 516. In the presence of data packets, the SS determines whether the currently allocated resource amount exceeds the amount for transmitting the data, that is, whether the current rate is likely to be decreased in step 518. If a rate decrement is required, the SS sends the data with in the decreased resource amount, that is, at a changed rate (Rate ½) in step 522. At the same time, the SS notifies the BS of the resource decrement, that is, the rate change. As stated before, the decrement of resources is indicated by the PBR field or the new STI bit of the Grant Management subheader. The SS then sends data packets at the changed rate in step 514.

If the current rate is not determined to be decreased at step 518, then in step 520, the SS determines whether are source increase is required. If resource increase is required, the SS requests resource allocation in step 512. The SS then sends data packets at the maximum rate, Rate 1.

While not shown in FIG. 5, even though the SS does not request resource allocation for each data frame transmission, the BS allocates resources to the SS in the previous amount.

D. Operation in the BS

Figure 6:
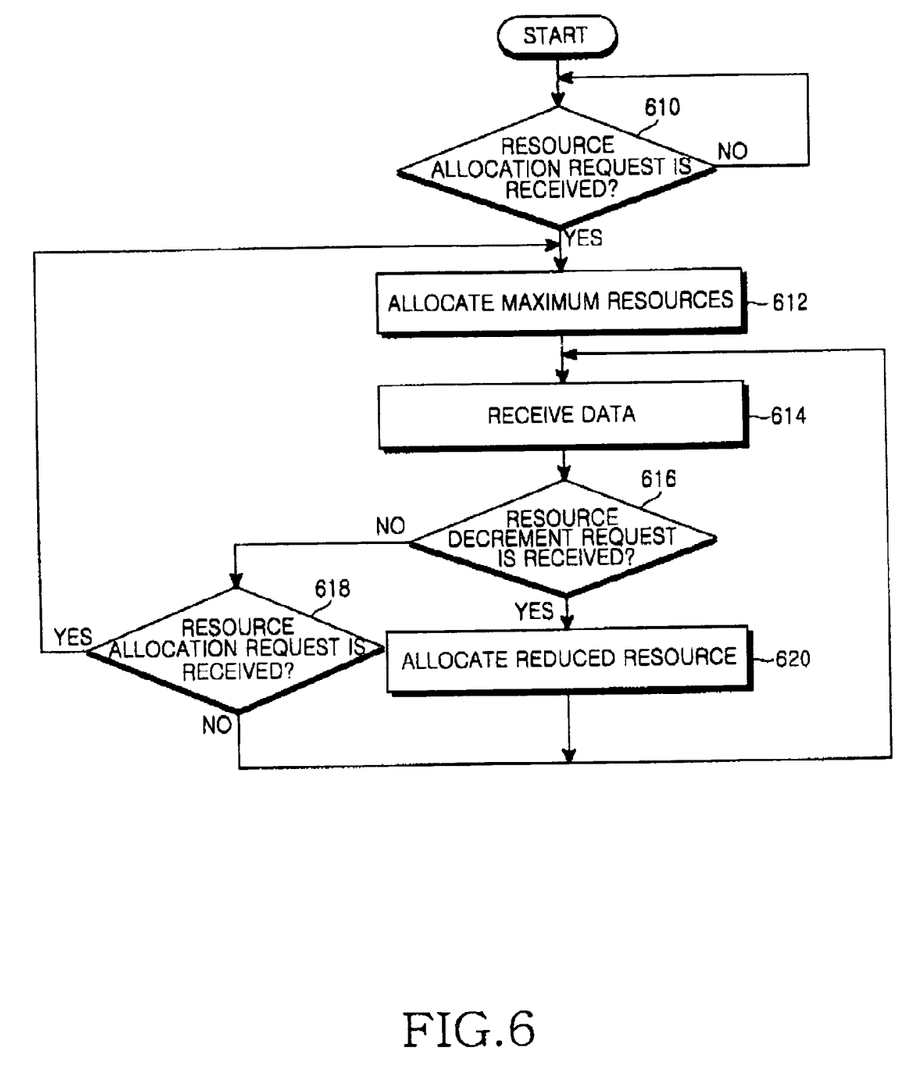
FIG. 6 is a flowchart illustrating an operation of the BS for the uplink scheduling according to the embodiment of the present invention.

FIG. 6 is a flowchart illustrating an operation of the BS for the uplink scheduling according to the embodiment of the present invention. Referring to FIG. 6, the BS monitors reception of a resource allocation request from the SS in step 610. For example, the resource allocation request is received by a Bandwidth Request Header. Upon receipt of the Bandwidth Request Header, the BS checks the BR field value of the Bandwidth Request Header. If the BR field value indicates the request of the uplink scheduling proposed by the present invention, for example if the BR field value is set to all 1 s, the BS allocates uplink resources according to the uplink scheduling scheme of the present invention. Otherwise, a typical uplink scheduling method applies, which will not be described herein.

After allocating resources required to support the maximum allowed rate for the SS in step 612, the BS receives data transmitted using the allocated resources from the SS in step 614. In step 616, the BS monitors reception of a resource decrement request from the SS. If the BS receives the resource decrement request, the BS allocates the resource in an amount indicated by the resource decrement request at step 620. If the BS does not receive the resource decrement request, the BS determines whether the resource allocation request is received at step 618. If the resource allocation request is received, the BS allocates the maximum amount of resource available for the SS.

Upon receipt of the resource decrement request in step 616, the BS allocates a reduced amount of resources, that is, resources required to support a lower data rate to the SS in step 620 and returns to step 614 where the BS receives data by the SS in the changed amount of resources by the SS.

On the other hand, if the BS receives the resource allocation request, the BS allocates the resources capable of supporting the maximum data rate in step 612. While not shown in FIG. 6, the BS allocates required resources for every data frame.

In accordance with the present invention as described above, uplink resources are allocated taking into account the uplink rate varying in real time. Therefore, optimum uplink scheduling is carried out. As a result, the following effects are achieved.

Data transmission efficiency is maximized and the overhead of an SS is reduced. Thus, resource dissipation is prevented.

Since resources are allocated taking into account the change of the uplink rate of the SS in real time, the resulting saved resources can be utilized for other purposes.

The SS notifies a BS of a rate change using residual resources saved by reducing the uplink rate. Hence, additional overhead is not produced.

The number of periodic resource allocation requests transmitted by the SS can be decreased. Therefore, unnecessary consumption of uplink resources for VoIP service can be reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data by a subscriber station (SS) in a wireless communication system, the method comprising the steps of:

transmitting to a base station (BS) data corresponding to a current data rate allocated by the BS; and transmitting, to the BS, a new data and a first information to indicate a change from the current data rate into a decreased data rate, when the data rate needs to be decreased, wherein a data rate of the new data is decreased corresponding to the decreased data rate in the first information.

2. The method of claim 1, wherein the first information is transmitted by using residual resources saved by decreasing the current data rate.

3. The method of claim 1, further comprising:

if the current data rate needs to be increased, transmitting, to the BS, an uplink allocation request; and receiving, from the BS, a maximum data rate allowed for the SS.

4. The method of claim 1, wherein transmitting, to the BS, data corresponding to a current data rate allocated by the BS comprises, if transmission data is presented, continuously transmitting a request allocation of the same data rate, from the BS, without polling.

5. The method of claim 1, wherein the first information is included in a Grant Management subheader, wherein the Grant Management subheader includes a first field or a second field, the first field including bits to indicate the decreased data rate, and the second field including bits to indicate a change from the current data rate into the decreased data rate.

6. The method of claim 1, wherein the first information is piggybacked with data generated in an uplink data rate indicated by a data rate index.

7. A resource allocation method in a base station (BS) in a wireless communication system, comprising:

receiving a new data and a first information to indicate a change from a current data rate into a decreased data rate; and reallocating, at the serving station, an uplink resource corresponding to a decrease request, wherein a data rate of the new data is decreased corresponding to the decreased data rate in the first communication.

8. The method of claim 7, wherein the first information is received by piggybacking the first information with a voice packet generated in a data rate corresponding to the decreased data rate.

9. The method of claim 7, further comprising, if transmission data of the SS is presented, continuously receiving a request allocation of the same data rate without polling, wherein the request allocation of the same data rate is included in a Bandwidth Request Header, the Bandwidth Request Header including information indicating that an additional request for allocation of a different data rate will not be sent until the current data rate is changed.

10. The method of claim 7, wherein the first information is received from the SS using residual resources saved by decreasing the current data rate.

11. The method of claim 7, wherein the decrease request is included in a Grant Management subheader, wherein the Grant Management subheader includes a first field or a second field, the first field including bits to indicate the decreased data rate, and the second field including bits to indicate a change from the current data rate into the decreased data rate.

12. The method of claim 7, further comprising:

if the current data rate needs to be increased, receiving from a subscriber station (SS) an uplink allocation request; and allocating a maximum data rate allowed for the SS.

* * * * *